(12) United States Patent
Olesen

(10) Patent No.: US 9,566,754 B2
(45) Date of Patent: Feb. 14, 2017

(54) TURBINE BLADE TEMPERATURE MEASUREMENT SYSTEM AND METHOD OF MANUFACTURE OF TURBINE BLADES

(75) Inventor: Ib Svend Olesen, Randers (DK)

(73) Assignee: VESTA WIND SYSTEMS A/S, Aarhus N (DK)

( * ) Notice: Subject to any disclaimer, the term of this patent is extended or adjusted under 35 U.S.C. 154(b) by 937 days.

(21) Appl. No.: 13/809,055

(22) PCT Filed: Jul. 6, 2011

(86) PCT No.: PCT/DK2011/050264
§ 371 (c)(1),
(2), (4) Date: Mar. 25, 2013

(87) PCT Pub. No.: WO2012/003836
PCT Pub. Date: Jan. 12, 2012

(65) Prior Publication Data
US 2013/0170991 A1    Jul. 4, 2013

Related U.S. Application Data

(60) Provisional application No. 61/362,384, filed on Jul. 8, 2010.

(30) Foreign Application Priority Data

Jul. 8, 2010 (GB) .................................. 1011543.4

(51) Int. Cl.
*B29C 65/00* (2006.01)
*B32B 41/00* (2006.01)
(Continued)

(52) U.S. Cl.
CPC ....... *B29D 99/0025* (2013.01); *B29C 65/4835* (2013.01); *B29C 66/0342* (2013.01);
(Continued)

(58) Field of Classification Search
CPC . B29D 99/0025; B29D 99/0028; B29C 66/90; B29C 66/91; B29C 66/912; B29C 66/9121; B29C 66/91211; B29C 66/91213; B29C 66/91214
(Continued)

(56) References Cited

U.S. PATENT DOCUMENTS 5,760,379 A * 6/1998 Matsen ............. B29C 66/73116
219/633
6,251,202 B1 * 6/2001 Murphy .............. B29C 65/1483
156/272.2
(Continued)

FOREIGN PATENT DOCUMENTS

DE      10021445 A1    11/2000
DE   102004060449 A1    6/2006
(Continued)

OTHER PUBLICATIONS

Multi-function, distributed optical fiber sensor for composite cure and response monitoring Dunphy et el (1990).*
(Continued)

*Primary Examiner* — Thomas Denion
*Assistant Examiner* — Jessica Kebea
(74) *Attorney, Agent, or Firm* — Patterson + Sheridan, LLP

(57) ABSTRACT

The invention provides a wind turbine blade comprising a first shell, having a first bonding region, and a second shell having a second bonding region, wherein the second bonding region of the second shell is bonded to the first bonding region of the first shell; and a temperature sensor positioned between the first bonding region and the second bonding region. Having a temperature sensor positioned within the turbine blade, in the region at which the two shells of the turbine blade are bonded together, allows for accurate deter-
(Continued)

mination and control of the temperature of the critical bonding regions during blade manufacture. The temperature sensor may be used during the service life of the wind turbine blade to detect delamination of the wind turbine blade.

13 Claims, 5 Drawing Sheets

(51) Int. Cl.
| | |
|---|---|
| *F03D 1/06* | (2006.01) |
| *F03D 3/06* | (2006.01) |
| *G01K 11/32* | (2006.01) |
| *B29L 31/08* | (2006.01) |
| *B29D 99/00* | (2010.01) |
| *B29C 65/48* | (2006.01) |
| *B29L 31/30* | (2006.01) |

(52) U.S. Cl.
CPC ...... *B29C 66/1122* (2013.01); *B29C 66/1142* (2013.01); *B29C 66/532* (2013.01); *B29C 66/54* (2013.01); *B29C 66/61* (2013.01); *B29C 66/636* (2013.01); *B29C 66/9161* (2013.01); *B29C 66/91211* (2013.01); *B29C 66/91221* (2013.01); *B29C 66/91411* (2013.01); *B29C 66/91431* (2013.01); *B29C 66/961* (2013.01); *B32B 41/00* (2013.01); *F03D 1/0675* (2013.01); *F03D 3/06* (2013.01); *G01K 11/32* (2013.01); *B29C 66/721* (2013.01); *B29C 66/91216* (2013.01); *B29L 2031/082* (2013.01); *B29L 2031/085* (2013.01); *B29L 2031/3038* (2013.01); *F05B 2260/83* (2013.01); *F05B 2270/303* (2013.01); *F05B 2270/804* (2013.01); *Y02E 10/721* (2013.01); *Y02P 70/523* (2015.11)

(58) Field of Classification Search
USPC ........................................................ 416/230
See application file for complete search history.

(56) References Cited

U.S. PATENT DOCUMENTS

| | | | | |
|---|---|---|---|---|
| 6,800,956 | B2* | 10/2004 | Bartlett | ................ F03D 1/0675 |
| | | | | 290/44 |
| 7,379,169 | B1 | 5/2008 | Kraemer et al. | |
| 7,473,385 | B2* | 1/2009 | Stiesdal | ................ B29C 70/443 |
| | | | | 264/258 |
| 7,740,064 | B2* | 6/2010 | McCoy | ................ E21B 47/123 |
| | | | | 166/250.01 |
| 7,824,592 | B2* | 11/2010 | van Breugel | ........ B29C 66/721 |
| | | | | 264/263 |
| 2001/0010251 | A1 | 8/2001 | Murphy | |
| 2004/0032270 | A1 | 2/2004 | Goldberg et al. | |
| 2010/0221111 | A1* | 9/2010 | Nieuwenhuizen | ...... F03D 1/065 |
| | | | | 416/61 |
| 2012/0255664 | A1* | 10/2012 | Lindner | ................ F16L 55/165 |
| | | | | 156/64 |
| 2013/0278918 | A1* | 10/2013 | Glavind | ................ F03D 9/002 |
| | | | | 356/32 |
| 2013/0280070 | A1* | 10/2013 | Lindby | ................... F03D 1/065 |
| | | | | 416/61 |
| 2013/0341497 | A1* | 12/2013 | Zuardy | ................. G01K 11/32 |
| | | | | 250/227.14 |

FOREIGN PATENT DOCUMENTS

| | | | | |
|---|---|---|---|---|
| DK | WO 03069324 A1 * | 8/2003 | ............. F03D 11/00 |
| DK | WO 2011137909 A1 * | 11/2011 | ............ B29C 70/48 |
| EP | 1677091 A1 | 7/2006 | |
| ES | EP 1677091 A1 * | 7/2006 | ......... G01M 11/085 |
| GB | 2440954 A | 2/2008 | |
| JP | 2000095217 A | 4/2000 | |
| WO | 2009068918 A1 | 6/2009 | |
| WO | 2010023140 A1 | 3/2010 | |

OTHER PUBLICATIONS

Application of the embedded Optical Fiber Bragg Grating sensors in curing monitring of Gr-Expoxy laminated composites—Tsai et al (Mar. 2009).*
Fiber Optic Sensor Evelopment for Real-Time In-Situ Epoxy Cure Monitoing—Liu et al (1997).*
Optical fibre long-period grating sensors characteristics and application—James et al (2003).*
UKIPO Combined Search and Examination Report dated Oct. 29, 2010 for Application No. GB1011543.4, 5pages.
PCT International Search Report dated Dec. 21, 2011 for International Application No. PCT/DK2011/050264, 3 pages.

* cited by examiner

TURBINE BLADE TEMPERATURE MEASUREMENT SYSTEM AND METHOD OF MANUFACTURE OF TURBINE BLADES

FIELD OF THE INVENTION

The invention relates to a system and method for the manufacture of a wind turbine blade. In particular, the invention relates to the bonding process used to join two turbine blade shells. The invention also relates to a system for detecting delamination of a wind turbine blade during use of the wind turbine blade.

BACKGROUND OF THE INVENTION

FIG. 1 illustrates wind turbine 1, comprising a wind turbine tower 2 on which a wind turbine nacelle 3 is mounted. A wind turbine rotor 4 comprising at least one wind turbine blade 5 is mounted on a hub 6. The hub 6 is connected to the nacelle 3 through a low speed shaft (not shown) extending from the nacelle front. The wind turbine illustrated in FIG. 1 may be a small model intended for domestic or light utility usage, or may be a large model, such as those that are suitable for use in large scale electricity generation on a wind farm, for example. In the latter case, the diameter of the rotor could be as large as 100 metres or more.

Wind turbine blades are typically made by forming two blade halves or shells, which are then bonded together to form the complete blade. Failure of the bond between the two shells, often called blade delamination, is a serious problem, as it most often occurs after the blade has been installed on a turbine.

The bonding process used to bond the two shells is critical in minimising the likelihood of delamination occurring and in increasing the useful lifetime of the turbine blade. Typically, the bonding of the two shells is performed by applying a bonding resin to one or both of the shells, pressing the shells together, and then curing the bonding resin in an oven. The temperature of the bonding resin during the curing process is critical in achieving good bond strength.

Typically, the blade is placed in an oven, and the oven temperature and curing time is controlled based on empirical data obtained from the manufacture of previous blades. However, no two blades are ever identical, nor is the performance of the oven used necessarily identical each time that it is used. We have appreciated that there is a need to provide a system and method for more accurate control of the bonding process for blade shells during wind turbine blade manufacture.

SUMMARY OF THE INVENTION

The present invention is defined in the appended independent claims to which reference should be made. Preferred aspects are set out in the dependent claims.

According to a first aspect of the invention, there is provided a wind turbine blade comprising a first shell, having a first bonding region, and a second shell having a second bonding region, wherein the second bonding region of the second shell is bonded to the first bonding region of the first shell; and a temperature sensor positioned between the first bonding region and the second bonding region.

The invention can be applied to any bonds between components in a wind turbine blade. For example, wind turbine blades typically include a reinforcing spar or webs between the shells to increase the structural strength of the blade. The invention can be applied to the bonds between the spar or webs and the blade shells.

Having a temperature sensor positioned within the turbine blade, in the region at which the two shells of the turbine blade are bonded together, allows an accurate determination of the temperature of the critical bonding regions during blade manufacture.

Preferably, the wind turbine blade further comprises an adhesive or bonding material bonding the first shell to the second shell, and the temperature sensor is embedded in the bonding material. Typically, the bonding material is a curable compound that is cured at a temperature above room temperature.

Following blade manufacture, the temperature sensor typically remains embedded within the turbine blade. For this reason it is important that the temperature sensor does not include any metallic, electrically conductive elements that might increase the risk of a lightning strike on the blade. Accordingly, in a preferred embodiment, the temperature sensor is an optical temperature sensor. The optical temperature sensor is preferably a Fibre Bragg Grating within an optical fibre. There may be a plurality of Fibre Bragg Gratings along the length of the optical fibre so as to detect the temperature of the bonding regions at a plurality of separate locations. A plurality of optical fibres, each including one or more Fibre Bragg Gratings, may be positioned between the first bonding region and the second bonding region. The optical temperature sensor may be a single distributed sensor extending around the bonding region, for example a distributed strain and temperature sensor (DSTS) available from Oz Optics. Sensors of this type allow the temperature to be determined at any point along its length using a time division multiplexing (TDM) technique. This allows hot and cold spots in the bonding region to be detected.

The temperature sensor may be used during the use of the wind turbine blade to detect delamination of the wind turbine blade. To this end, the temperature sensor is preferably located in the trailing edge of the turbine blade, as this is where delamination most frequently occurs. Delamination can be detected or inferred if the sensor is broken i.e. gives no signal, or suddenly gives a significantly different output. If the temperature sensor is a Fibre Bragg Grating sensor, then it may be used to directly measure strain, and so directly detect whether there is significant deformation of the sensor in the bonding region.

In another aspect of the invention, there is provided a method of assembly of a wind turbine blade, comprising:
forming a first shell and a second shell;
applying a heat curable bonding material to the first shell or the second shell, or both the first and second shell;
providing a temperature sensor;
placing the first shell in contact with the second shell, such that the bonding material and the temperature sensor are sandwiched between the first and second shells; and
curing the bonding material, wherein the step of curing comprises monitoring the temperature detected by the optical temperature sensor, and controlling the heat applied to the bonding material based on the detected temperature.

By directly monitoring the temperature of the curable bonding material, and controlling the applied heat in response to the detected temperature, the physical properties of the bond between the first shell and the second shell can be assured. Preferably, the method includes providing a plurality of temperature sensors between the first and second shells. This allows a good bond to be assured in a plurality of locations, which might reach different temperatures during the curing process.

Preferably, the temperature sensor is an optical temperature sensor. Preferably, the optical temperature sensor is a Fibre Bragg Grating sensor within an optical fibre. Preferably, the optical fibre extends around a periphery of the first and second shells in a region in which they are bonded. The optical fibre may contain a plurality of Fibre Bragg Grating sensors.

In yet a further aspect of the invention, there is provided a system for manufacturing a wind turbine blade, comprising:

an oven, the oven holding first and second blade shells;
a temperature sensor placed between the blade shells in a region where the first and second blade shells are to be bonded together;
processing electronics connected to the temperature sensor for determining a temperature in the region in which the first and second blade shells are to be bonded together, based on signals from the temperature sensor; and
an oven controller, the oven controller connected to the processing electronics, the oven controller controlling the heat supplied to the oven, based on the temperature of the bonding region, as determined by the processing electronics.

The oven may allow for local heating control so that more heat can be applied to thicker portions of the blade than to thinner portions of the blade. Preferably, the system includes a temperature sensor, or a plurality of temperature sensors capable of providing a measure of temperature at a plurality of locations. The processing electronics may then be configured to provide a plurality of temperature measurements to the oven controller and the oven controller may then provide different amounts of heat to different parts of the oven based on the temperature measurements. This can be an automated process, for example using suitable software in the oven controller, or can be a manually controlled process.

In a preferred embodiment, the temperature sensor is an optical temperature sensor. The optical temperature sensor is preferably a Fibre Bragg Grating within an optical fibre. There may be a plurality of Fibre Bragg Gratings along the length of the optical fibre so as to detect the temperature of the bonding regions at a plurality of separate locations. Alternatively, a plurality of optical fibres, each including one or more Fibre Bragg Gratings, may be positioned between the first bonding region and the second bonding region.

In a further aspect of the invention, there is provided a wind turbine blade comprising a plurality of components, at least two of the components bonded together in a bonding region; and a temperature sensor positioned in the bonding region between the two components. The two components may be a first blade shell and one of a second blade shell, a spar and a web.

In a still further aspect of the invention, there is provided a wind turbine blade comprising a first shell, having a first bonding region, and a spar having a second bonding region, wherein the second bonding region of the spar is bonded to the first bonding region of the first shell; and a temperature sensor positioned between the first bonding region and the second bonding region.

In a still further aspect of the invention, there is provided a wind turbine blade comprising a first shell, having a first bonding region, and a web having a second bonding region, wherein the second bonding region of the web is bonded to the first bonding region of the first shell; and a temperature sensor positioned between the first bonding region and the second bonding region.

In a still further aspect of the invention, there is provided a method of assembly of a wind turbine blade, comprising:
forming first and second components of the wind turbine blade;
applying a heat curable bonding material to one or both of the components; providing a temperature sensor;
placing the first component in contact with the second component, such that the bonding material and the temperature sensor are sandwiched between the first and second components; and
curing the bonding material, wherein the step of curing comprises monitoring the temperature detected by the optical temperature sensor, and controlling the heat applied to the bonding material based on the detected temperature. The first and second components may be a first blade shell and one of a second blade shell, a spar and a web.

In a still further aspect of the invention, there is provided a method of assembly of a wind turbine blade, comprising:
forming a first shell and a spar;
applying a heat curable bonding material to the first shell or the spar, or both the first shell and the spar;
providing a temperature sensor;
placing the first shell in contact with the spar, such that the bonding material and the temperature sensor are sandwiched between the first shell and the spar; and
curing the bonding material, wherein the step of curing comprises monitoring the temperature detected by the optical temperature sensor, and controlling the heat applied to the bonding material based on the detected temperature.

In a still further aspect of the invention, there is provided a method of assembly of a wind turbine blade, comprising:
forming a first shell and a web;
applying a heat curable bonding material to the first shell or the web, or both the first shell and the web;
providing a temperature sensor;
placing the first shell in contact with the web, such that the bonding material and the temperature sensor are sandwiched between the first shell and the web; and
curing the bonding material, wherein the step of curing comprises monitoring the temperature detected by the optical temperature sensor, and controlling the heat applied to the bonding material based on the detected temperature.

In a still further aspect of the invention, there is provided a system for manufacturing a wind turbine blade, comprising:
an oven, the oven holding first and second blade components;
a temperature sensor placed between the blade components in a region where the first and second blade components are to be bonded together;
processing electronics connected to the temperature sensor for determining a temperature in the region in which the first and second blade components are to be bonded together, based on signals from the temperature sensor; and
an oven controller, the oven controller connected to the processing electronics, the oven controller controlling the heat supplied to the oven, based on the temperature of the bonding region, as determined by the processing electronics. The first and second components may be a first blade shell and one of a second blade shell, a spar and a web.

In a still further aspect of the invention, there is provided a system for manufacturing a wind turbine blade, comprising:

an oven, the oven holding a first blade shell and a spar;

a temperature sensor placed between the first blade shell and the spar in a region where the first blade shell and the spar are to be bonded together;

processing electronics connected to the temperature sensor for determining a temperature in the region in which the first blade shell and the spar are to be bonded together, based on signals from the temperature sensor; and an oven controller, the oven controller connected to the processing electronics, the oven controller controlling the heat supplied to the oven, based on the temperature of the bonding region, as determined by the processing electronics.

In a still further aspect of the invention, there is provided a system for manufacturing a wind turbine blade, comprising:

an oven, the oven holding a first blade shell and a web;

a temperature sensor placed between the first blade shell and the web in a region where the first blade shell and the web are to be bonded together;

processing electronics connected to the temperature sensor for determining a temperature in the region in which the first blade shell and the web are to be bonded together, based on signals from the temperature sensor; and an oven controller, the oven controller connected to the processing electronics, the oven controller controlling the heat supplied to the oven, based on the temperature of the bonding region, as determined by the processing electronics.

In a still further aspect of the invention, there is provided a wind turbine comprising a wind turbine blade in accordance with the first aspect.

In yet a further aspect of the invention there is provided a blade delamination detection system comprising a wind turbine blade in accordance with the first aspect, and an optical detector connected to the optical temperature sensor, wherein the optical detector is configured to detect a step change in the output from the optical temperature sensor indicative of blade delamination.

It should be clear that features referred to in connection with one aspect of the invention may equally applied to other aspects of the invention. In particular features referred to in relation to the bonding of blade shells to one another may equally be applied to the bonding of a blade shell to a reinforcing spar or web.

BRIEF DESCRIPTION OF THE DRAWINGS

Preferred embodiments of the invention will now be described, by way of example, and with reference to the drawings, in which.

DETAILED DESCRIPTION

Figure 2:
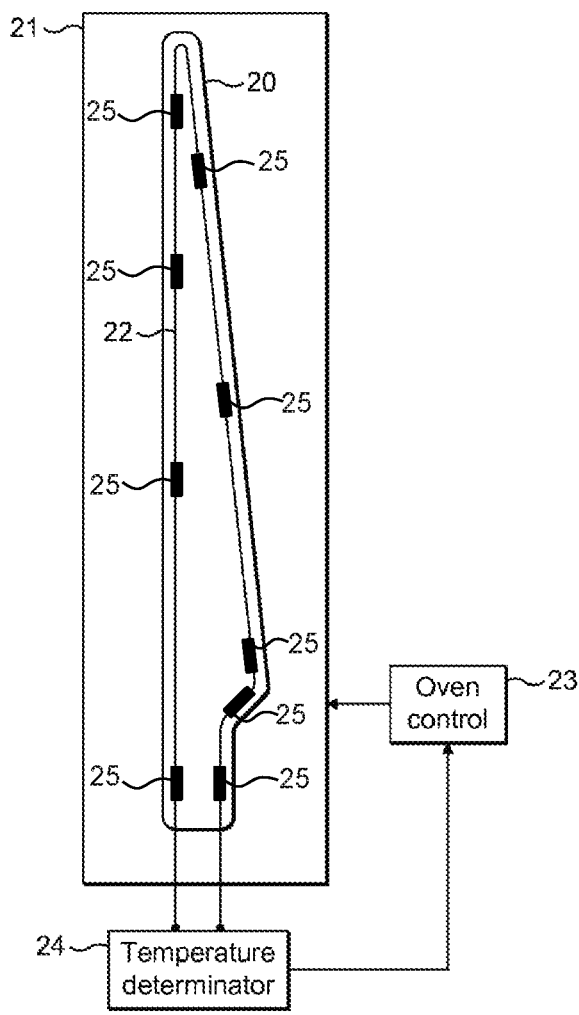
FIG. 2 is a schematic illustration of a wind turbine blade with an optical fibre temperature sensor located in a bonding region between two shells of the wind turbine blade.
Figure 3:
FIG. 3 is a schematic cross-section of the two shells of the wind turbine blade of FIG. 2, showing the position of the optical fibre temperature sensor.

FIG. 2 is a schematic illustration of a turbine blade 20 located in an oven 21, during a curing process to bond two shells of the wind turbine blade together. FIG. 3 is an exploded cross sectional view of the wind turbine blade of FIG. 2, more clearly showing the two shells 30, 31 and the position of an optical fibre temperature sensor 22 between the two shells.

The construction of a wind turbine blade in accordance with the present invention is most clearly shown in FIG. 3. The turbine blade comprises an upper shell 30 and a lower shell 31 that are bonded together to form a completed blade 20. Each shell 30, 31 is typically formed of a resin impregnated fibre composite. This type of blade construction for wind turbine blades is well-know in the art.

The upper and lower shells 30, 31 are bonded together at their peripheries, herein referred to "bonding regions". The bonding regions extend around the edge of each shell and are essentially where the two shells meet when placed together to form a complete blade.

The shells may also be bonded together in an interior region and so the bonding regions may not be limited to the edges of the two shells. For example, large wind turbine blades are typically provided with a spar or webs extending between the two shells within the interior of the blade. The spar or webs provide structural strength. The spar or webs are bonded to each shell at bonding regions using the same type of resin that is used to both the shells directly to one another, A bonding resin 32 is placed on one or both of the shells in their bonding regions, in order to bond the two shells together. In the example illustrated in FIG. 3, bonding resin is applied to both the upper shell 30 and the lower shell 31. The bonding resin may be any suitable type of heat curable resin, adhesive or glue, known in the art.

In order to form a strong bond, the bonding resin must be heated to a particular curing temperature and then cooled. The rate of heating and cooling of the resin, as well as the absolute temperature reached by the resin, largely determine the physical properties of the resulting bond.

FIG. 2 shows a turbine blade within an oven 21 used to raise the bonding resin to its curing temperature. The heat supplied by the oven 21 is controlled by an oven control system 23. The oven control system 23 is typically an electronic control system, and the oven is typically an electrically powered oven. The oven control system 23 may allow for local control so that different amounts of heat can be supplied to different portions of the oven.

Rather than simply detect the temperature at one position within the oven, or estimate the temperature based on the power or heat applied to the oven, the present invention directly detects the temperature of the resin that is to be cured. The detected temperature can then be continuously supplied to the oven control system 23 during the curing process in a feedback loop. In this way, the temperature of the resin in the curing process can be accurately controlled and made to follow the desired temperature profile, resulting in a strong bond.

In order to accurately and directly detect the temperature of the resin 32, an optical temperature sensor 22 is used. In the example illustrated in FIGS. 2 and 3, the optical temperature sensor is an optical fibre 22, including one or more Fibre Bragg Gratings. The optical fibre 22 is placed between the upper and lower shelves 30, 31 in the resin 32. The fibre extends from an opto-electronic processor 24 around the bonding region of the upper and lower shelves 30, 31 and back to the opto-electronic processor 24. The processor 24 is typically located outside the oven 21. One or more Fibre Bragg Gratings within the optical fibre are used to detect the temperature within the bonding region. The use of Fibre Bragg Gratings to detect temperature is well-known. See, for example, U.S. Pat. No. 7,379,169. Changes in the frequency response of a Fibre Bragg Grating can be used to determine changes in temperature at the position of the Fibre Bragg Grating. A single optical fibre forming a distributed sensor extending around the periphery of the blade may alternatively be used. For example, FIG. 2 illustrates nine Fibre Bragg Gratings 25 arranged on a single optical fibre 22 arranged around the periphery of the turbine blade 21, wherein each of the nine Fibre Bragg Gratings 25 detects a temperature at its location. In other embodiments, more or fewer than nine Fibre Bragg Gratings 25 could be arranged on the optical fibre 22.

The opto-electronic processor 24 generates a signal indicative of the resin temperature at one or more locations within the bonding regions based on output from the sensor or sensors, and passes that signal to the oven control system 23. The oven control system 23 then adjusts the heat or power supplied to the oven 21, or portions of the oven, to maintain the resin at the desired temperature.

Figure 4:
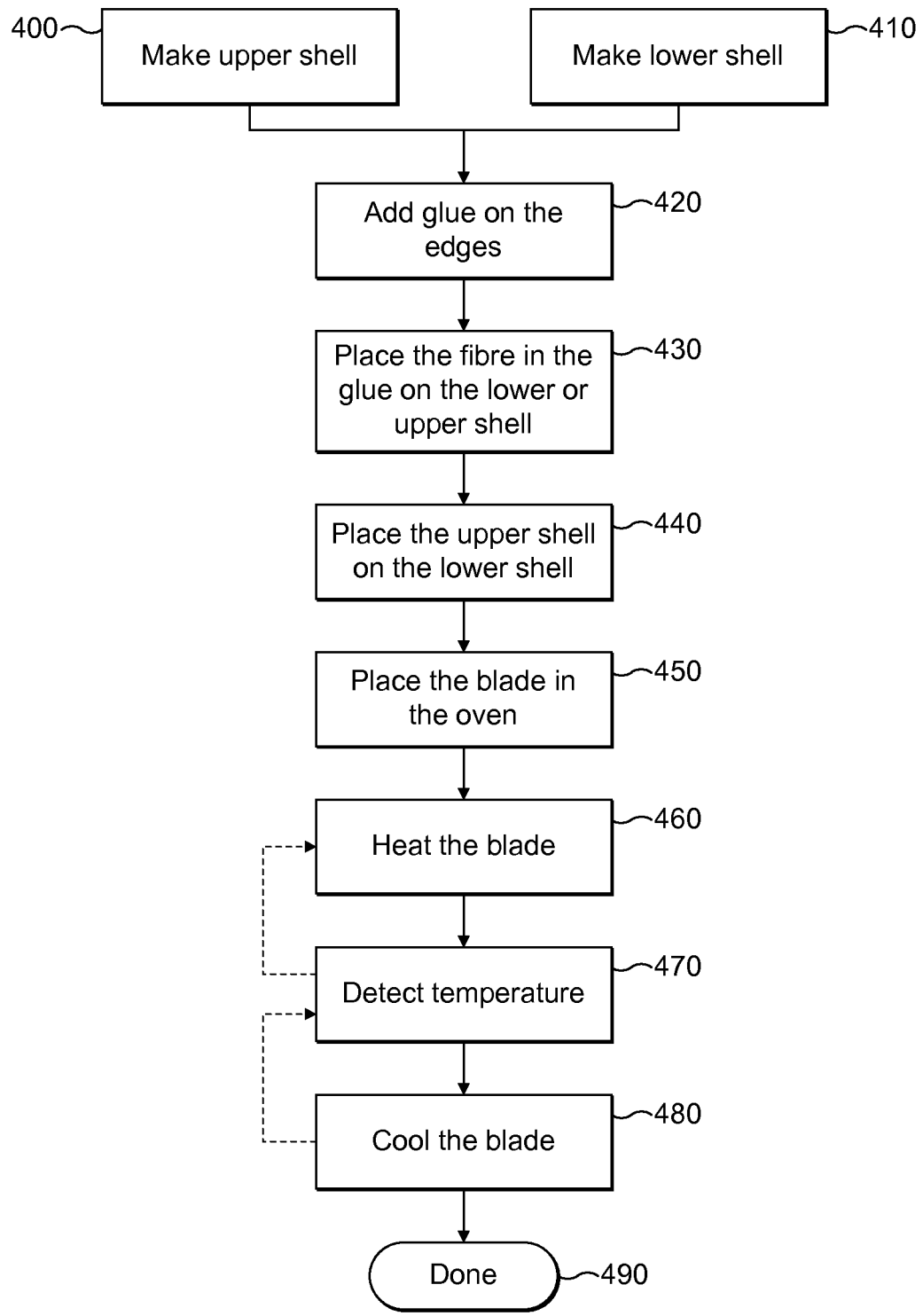
FIG. 4 is a flow diagram illustrating a method of forming a wind turbine blade in accordance with the invention.

FIG. 4 is a flow diagram illustrating the steps carried out in a method for manufacturing a wind turbine blade in accordance with the present invention.

In steps 400 and 410 the upper and lower shells of the wind turbine blade are made. The upper and lower shells can be manufactured in accordance with any standard techniques known in the art. In step 420 resin or glue is applied to the upper shell or the lower shell or both the upper and lower shell in their bonding regions. The optical fibre, including the Fibre Bragg Grating, is then placed in the resin on the upper or lower shell in step 430. The upper shell is then place on the lower shell at step 440, sandwiching the curable resin and the optical fibre between them. The blade is placed in an oven in step 450. Alternatively, steps 420 to 440 may be carried out in the oven before it is heated. The blade is then heated in step 460 in order to begin the curing process and bond the two blade shells together.

Figure 1:
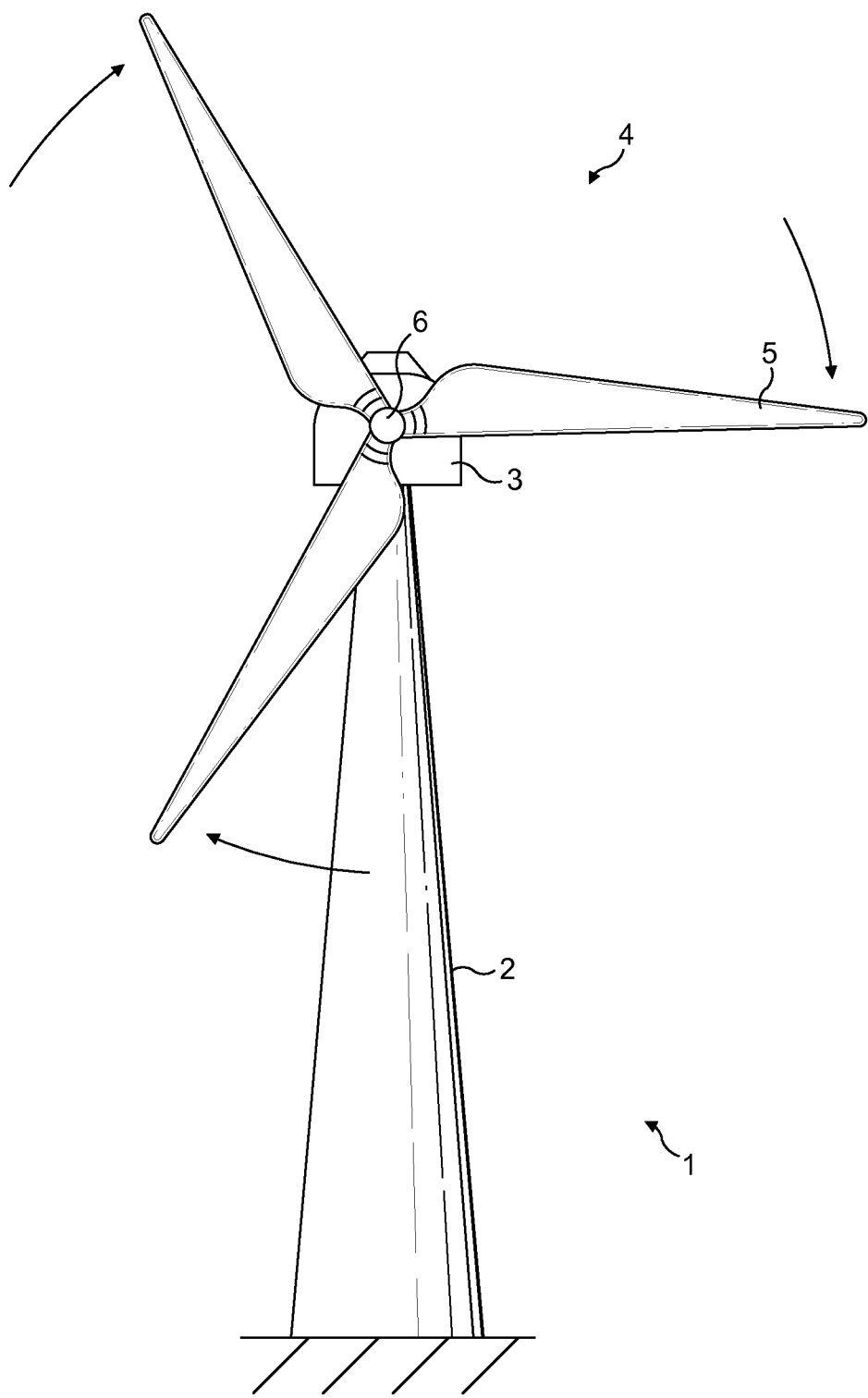
FIG. 1 illustrates a known wind turbine.

In step 470 the temperature of the resin is detected using the optical temperature sensor and, as described with reference to FIG. 1, the amount of heat applied to the blade is controlled dependent on the detected temperature. This feedback control is illustrated by a dotted line between steps 470 and 460 in FIG. 4. Once the desired temperature is reached, the oven may maintain the resin at that temperature for a while to allow the resin to completely cure.

In step 480 the blade is cooled. If the rate of cooling of the resin is important, the temperature of the resin can continue to be monitored during the cooling step 480, and the rate of cooling accordingly controlled. This feedback control is illustrated by a dotted line between steps 480 and 470 in FIG. 4.

Once the blade is cooled back to ambient temperature, the manufacturing process is complete. This is illustrated by step 490.

Although the present invention has been described with the resin being cured by placing the wind turbine blade in an oven, it is possible to apply heat to the resin by other means, for example by directly applying heating elements to the surface of the blade.

More than one optical fibre may be provided between the upper and lower shells in accordance with the present invention. Having more than one optical fibre provides redundancy. It may also be more cost effective to use multiple single grating fibres than a multiple grating fibre or a fibre with an elongated grating. It may also allow blade delamination to be detected at an earlier stage, as described below.

Figure 5:
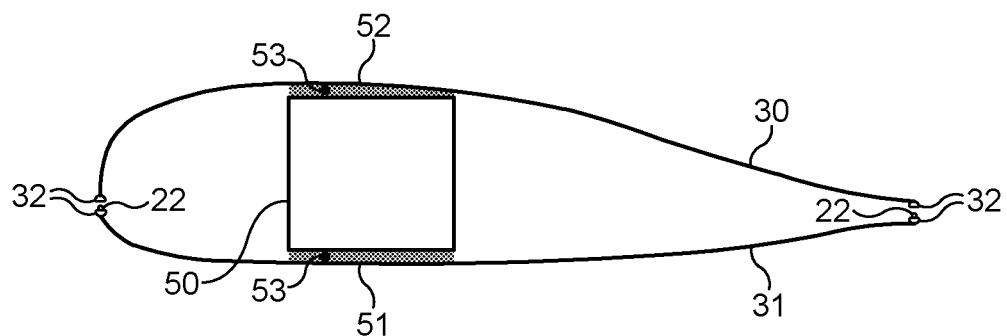
FIG. 5 is a schematic cross-section of the two shells of a wind turbine blade, showing the position of a spar bonded to the two shells.
Figure 6:
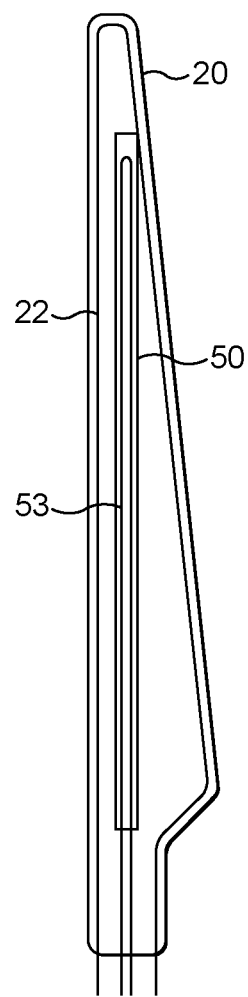
FIG. 6 is a schematic illustration of the blade of FIG. 5, showing the longitudinal extent of the spar.

As already described, it is possible to provide an optical temperature sensor in any bond in a wind turbine blade. FIG. 5 shows a schematic cross-section of a wind turbine blade including a spar 50 bonded to the upper and lower shells 30, 31. FIG. 6 illustrates the spar extending from near the root of the blade 20 to near to the tip of the blade. The spar is bonded to both the upper and lower shells using a heat curable resin in bonding regions 51, 52, in the same manner as the two shells are bonded to each other. One or more optical fibres 53 may be provided in each bonding region between the spar and the respective blade shell and can be used to monitor the temperature of the bonding resin during the assembly process.

Figure 7:
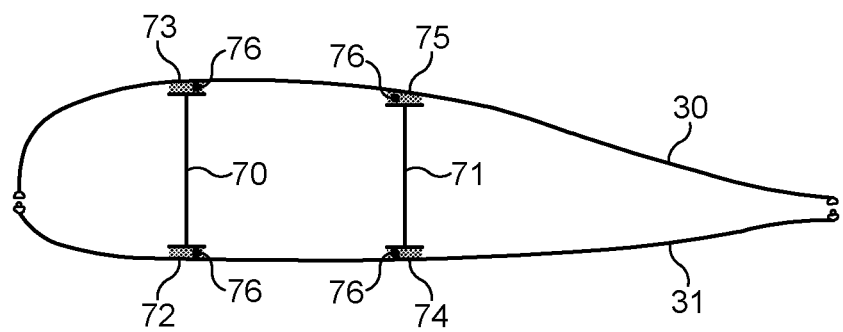
FIG. 7 is schematic cross-section of the two shells of a wind turbine blade, showing the position of a pair of webs bonded to the two shells.

FIG. 7 is a schematic cross-section showing the use of reinforcing webs 70, 71 instead of the box spar 50 shown in FIG. 5. The webs 70, 71 and the blade shells 30, 31 are bonded together using a heat curable resin at bonding regions 72, 73, 74 and 75. One or more optical fibres 76 may be provided in each bonding region between a web and a blade shell and can be used to monitor the temperature of the bonding resin during the assembly process.

There is a particular additional advantage in including an optical temperature sensor, and in particular a Fibre Bragg Grating or Long Periond Grating (LPG), at the trailing edge of a wind turbine blade between the upper and lower shells. One common problem with wind turbine blades is separation of the upper and lower shells during service. This is called blade delamination, and most frequently occurs at the trailing edge of the blade. The optical temperature sensor used in the manufacturing process of the present invention may subsequently be used during use and servicing of the wind turbine blade as a means of detecting blade delamination. A step change in the optical response of the optical temperature sensor, or simply failure of the optical temperature sensor, during use of the wind turbine blade, is indicative of blade delamination. Fibre Bragg Gratings can be used to directly measure strain at their location. A sudden change in the strain experienced by a Fibre Bragg Grating located between the upper and lower shells is indicative of blade delamination, particularly if uncorrelated to strain measurement taken elsewhere on the blade.

Accordingly, a wind turbine blade in accordance with the present invention has advantages both in the manufacture of the wind turbine blade and in detection of blade delamination during use of the wind turbine blade.

Given that the temperature sensor remains within the blade when it is mounted on a wind turbine, it is desirable that the optical temperature sensor does not include any metallic, or highly electrically conductive elements, which would significantly increase the risk of lightning strikes. For this reason, optical temperature sensors are most desirable, and Fibre Bragg Grating offer a particularly advantageous solution.

Although Fibre Bragg Gratings are a preferred form of temperature sensor, other types of temperature sensor may alternatively or additionally be employed. For example, Long Period Gratings (LPGs) may be used. LPGs may be used not only to detect temperature but also bending of the blade during its use. This allows for detection of general structural damage to the blade as well as delamination. Distributed optical fibre sensors based on Raman or Brillouin scattering may also be used.

The invention has been described with reference to example implementations, purely for the sake of illustration. The invention is not limited by these, as many modifications and variations would occur to the skilled person. The invention is to be understood from the claims that follow.

The invention claimed is:

1. A method of assembling a wind turbine blade, comprising:
    providing a first shell and a second shell;
    applying a heat curable bonding material to the first shell or the second shell, or both the first and second shell;
    providing an optical temperature sensor, wherein the optical temperature sensor is one or more Fibre Bragg Grating sensors within an optical fibre, and wherein the optical fibre extends around a periphery of the first and second shells in a region in which they are bonded;
    placing the first shell in contact with the second shell, wherein the bonding material and the optical temperature sensor are sandwiched between the first and second shells and wherein the optical temperature sensor is disposed in the bonding material; and
    curing the bonding material, wherein the step of curing comprises monitoring the temperature of the bonding material detected by the optical temperature sensor, and controlling the heat applied to the bonding material based on the detected temperature.

2. A method according to claim 1, wherein the method includes providing a plurality of optical temperature sensors between the first and second shells.

3. A system of manufacturing a wind turbine blade, comprising:
    an oven, the oven holding first and second blade shells;
    a bonding material arranged in a region between the blade shells where the first and second blade shells are to be bonded together;
    at least one optical temperature sensor placed in the region where the first and second blade shells are to be bonded together, wherein the optical temperature sensor is a Fibre Bragg Grating within an optical fibre, and wherein the optical fibre extends around a periphery of the first and second shells in the region in which they are bonded;
    an opto-electronic processor connected to the optical temperature sensor and operable to determine a temperature at the bonding material, based on signals from the optical temperature sensor; and
    an oven controller, the oven controller connected to the opto-electronic processor, the oven controller controlling the heat supplied to the oven, based on the temperature of the bonding material, as determined by the opto-electronic processor.

4. A system according to claim 3, further comprising a plurality of Fibre Bragg Gratings along the length of the optical fibre.

5. A system according to claim 3, wherein the at least one optical temperature sensor is a plurality of optical temperature sensors, wherein the region where the first and second blade shells are to be bonded together has a first bonding region on the first blade shell and a second bonding region on the second blade shell, wherein the plurality of optical temperature sensors are positioned between the first bonding region and a second bonding region, each of the plurality of optical temperature sensors one or more Fibre Bragg Gratings.

6. A method of assembling a wind turbine blade, comprising:
    forming first and second components of the wind turbine blade;
    applying a heat curable bonding material to one or both of the components;
    providing an optical temperature sensor, wherein the optical temperature sensor is one or more Fibre Bragg Grating sensors within an optical fibre, and wherein the optical fibre extends around a periphery of the first and second components in a region in which they are bonded;
    placing the first component in contact with the second component, wherein the bonding material and the optical temperature sensor are sandwiched between the first and second components; and
    curing the bonding material, wherein the step of curing comprises monitoring the temperature of the bonding material detected by the optical temperature sensor, and controlling the heat applied to the bonding material based on the detected temperature.

7. A method according to claim 6, wherein the first and second components are a first blade shell and one of a second blade shell, a spar and a web.

8. A method of assembling a wind turbine blade, comprising:
    forming a first shell and a spar;
    applying a heat curable bonding material to the first shell or the spar, or both the first shell and the spar;
    providing an optical temperature sensor in contact with the heat curable bonding material, wherein the optical temperature sensor is one or more Fibre Bragg Grating sensors within an optical fibre, and wherein the optical fibre extends around a periphery of the first shell and spar in a region in which they are bonded;
    placing the first shell in contact with the spar, wherein the bonding material and the optical temperature sensor are sandwiched between the first shell and the spar; and
    curing the bonding material, wherein the step of curing comprises monitoring the temperature of the bonding material detected by the optical temperature sensor, and controlling the heat applied to the bonding material based on the detected temperature.

9. A method of assembling a wind turbine blade, comprising:
    forming a first shell and a web;
    applying a heat curable bonding material to the first shell or the web, or both the first shell and the web;
    providing an optical temperature sensor, wherein the optical temperature sensor is one or more Fibre Bragg Grating sensors within an optical fibre, and wherein the optical fibre extends around a periphery of the first shell and the web in a region in which they are bonded;
    placing the first shell in contact with the web, wherein the bonding material and the optical temperature sensor are sandwiched between the first shell and the web; and
    curing the bonding material, wherein the step of curing comprises monitoring the temperature of the bonding material detected by the optical temperature sensor, and controlling the heat applied to the bonding material based on the detected temperature.

10. A system to manufacture a wind turbine blade, comprising:
- an oven adapted to hold first and second blade components during a curing process in which a bonding material, arranged in a bonding region between the blade components, is cured;
- an optical temperature sensor positionable in the bonding material between the blade components in the bonding region, wherein the optical temperature sensor is a Fibre Bragg Grating within an optical fibre, and wherein the optical fibre extends around a periphery of the first and second blade components in a region in which they are bonded;
- an opto-electronic processor connected to the optical temperature sensor for determining a temperature in the bonding material, based on signals from the optical temperature sensor; and
- an oven controller communicatively connected to the oven and to the opto-electronic processor, the oven controller controlling the heat supplied to the oven, based on the temperature of the bonding material, as determined by the opto-electronic processor.

11. A system according to claim 10, wherein the first and second components are a first blade shell and one of a second blade shell, a spar and a web.

12. A system to manufacture a wind turbine blade, comprising:
- an oven, the oven holding a first blade shell and a spar;
- a bonding material arranged in a region between the first blade shell and the spar where the first blade shell and the spar are to be bonded together;
- an optical temperature sensor placed between the first blade shell and the spar in the region where the first blade shell and the spar are to be bonded together, wherein the optical temperature sensor is a Fibre Bragg Grating within an optical fibre, and wherein the optical fibre extends around a periphery of the first blade shell and the spar in a region in which they are bonded;
- an opto-electronic processor connected to the optical temperature sensor for determining a temperature in the bonding material, based on signals from the optical temperature sensor; and
- an oven controller, the oven controller connected to the opto-electronic processor, the oven controller controlling the heat supplied to the oven, based on the temperature of the bonding material, as determined by the opto-electronic processor.

13. A system to manufacture a wind turbine blade, comprising:
- an oven, the oven holding a first blade shell and a web;
- a bonding material arranged in a region between the first blade shell and the web where the first blade shell and the web are to be bonded together;
- an optical temperature sensor placed between the first blade shell and the web in the region where the first blade shell and the web are to be bonded together, wherein the optical temperature sensor is a Fibre Bragg Grating within an optical fibre, and wherein the optical fibre extends around a periphery of the first blade shell and the web in a region in which they are bonded;
- an opto-electronic processor connected to the optical temperature sensor for determining a temperature in the bonding material, based on signals from the optical temperature sensor; and
- an oven controller, the oven controller connected to the opto-electronic processor, the oven controller controlling the heat supplied to the oven, based on the temperature of the bonding material, as determined by the opto-electronic processor.

* * * * *